United States Patent
Twomey

(10) Patent No.: US 7,246,245 B2
(45) Date of Patent: Jul. 17, 2007

(54) SYSTEM ON A CHIP FOR NETWORK STORAGE DEVICES

(75) Inventor: John E. Twomey, Bedford, MA (US)

(73) Assignee: Broadcom Corporation, Irvine, CA (US)

( * ) Notice: Subject to any disclaimer, the term of this patent is extended or adjusted under 35 U.S.C. 154(b) by 764 days.

(21) Appl. No.: 10/112,896

(22) Filed: Apr. 1, 2002

(65) Prior Publication Data

US 2003/0131228 A1 Jul. 10, 2003

Related U.S. Application Data

(60) Provisional application No. 60/347,489, filed on Jan. 10, 2002.

(51) Int. Cl.
*G06F 21/00* (2006.01)

(52) U.S. Cl. .................................................. 713/189

(58) Field of Classification Search ............... 713/153, 713/189, 192, 375
See application file for complete search history.

(56) References Cited

U.S. PATENT DOCUMENTS

| 5,778,071 | A | | 7/1998 | Caputo et al. | |
|---|---|---|---|---|---|
| 5,818,840 | A | * | 10/1998 | Adams | 370/395.1 |
| 5,896,499 | A | | 4/1999 | McKelvey | |
| 6,327,625 | B1 | | 12/2001 | Wang et al. | |
| 6,792,507 | B2 | * | 9/2004 | Chiou et al. | 711/119 |
| 6,839,346 | B1 | * | 1/2005 | Kametani | 370/389 |
| 6,901,516 | B1 | * | 5/2005 | Howard et al. | 713/193 |
| 2002/0083344 | A1 | * | 6/2002 | Vairavan | 713/201 |
| 2003/0074473 | A1 | * | 4/2003 | Pham et al. | 709/246 |
| 2004/0117653 | A1 | * | 6/2004 | Shapira et al. | 713/201 |

FOREIGN PATENT DOCUMENTS

| EP | 03000503.7 | 9/2005 |
|---|---|---|
| WO | WO 01/05086 | 1/2001 |
| WO | WO 01/80013 | 10/2001 |

OTHER PUBLICATIONS

Spurgeon, Charles, "Quick Reference Guide to the Ethernet System", Section 1.2, Sep. 4, 1995, pp. 1, obtained from http://www.ethermanage.com/ethernet/10quickref/ch1qr_3.html.*

(Continued)

*Primary Examiner*—Emmanuel L. Moise
*Assistant Examiner*—Jeffrey Popham
(74) *Attorney, Agent, or Firm*—Garlick Harrison & Markison

(57) ABSTRACT

In one embodiment, an apparatus includes a first integrated processor, a second integrated processor, and a security processor. The first integrated processor has one or more network interfaces for receiving packets and also has a second interface. The second integrated processor is coupled to the second interface. A security processor is coupled to the second integrated processor. Also, a storage switch is contemplated employing one or more line cards which include the apparatus. The storage switch further includes at least one switch fabric card coupled to the at least one line card, wherein the switch fabric card is configured to route packets from the at least one line card and from one or more storage devices on a switch fabric. In another embodiment, the integrated processors may be systems on a chip (SOCs).

20 Claims, 9 Drawing Sheets

OTHER PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB-1 CPU, Oct. 2000, rev. 0.1, 1 page.
SiByte, "Fact Sheet," SB-1250, Oct. 2000, rev. 0.2, 10 pages.
Stepanian, SiByte, SiByte SB-1 MIPS64 CPU Core, Embedded Processor Forum 2000, Jun. 13, 2000, 15 pages.
Clark, Tom; "IP Storage in Data Center Applications"; Oct. 1, 2001; pp. 201-220; Addison Wesley Inc., Boston, MA 02116; XP-002336284.

* cited by examiner

SYSTEM ON A CHIP FOR NETWORK STORAGE DEVICES

This application claims benefit of priority to Provisional Patent Application Ser. No. 60/347,489, filed Jan. 10, 2002, which is incorporated herein by reference in its entirety.

BACKGROUND OF THE INVENTION

1. Field of the Invention

This invention is related to the field of packet processing systems and handling encrypted and non-encrypted packet traffic such systems, and also to the field of networked devices such as network storage devices.

2. Description of the Related Art

Various computing systems and related devices are becoming increasingly networked. While computer systems (e.g. personal computers, or PCs, servers, etc.) have been networked for some time, other devices have recently been networked as well. For example, storage systems are being networked in various ways such as storage area networks (SANs) implemented using various protocols (e.g. Fiber Channel over Internet Protocol (FCIP) or Small Computer Systems Interface over TCP/IP (iSCSI)) or network attached storage (NAS). Such storage solutions include storage devices and circuitry to communicate using various network protocols such as Transport Control Protocol/Internet Protocol (TCP/IP).

While networking is becoming more ubiquitous, it is also a rapidly changing field with new standards being developed and older standards being modified. Additionally, as publicly available networks such as the Internet are increasingly being used as part of the network, encryption of networked traffic is becoming more prevalent. Accordingly, networked computer systems and storage devices may be required to handle both encrypted and non-encrypted network traffic.

SUMMARY OF THE INVENTION

In one embodiment, an apparatus includes a first integrated processor, a second integrated processor, and a security processor. The first integrated processor has one or more network interfaces for receiving packets and also has a second interface. The second integrated processor is coupled to the second interface. A security processor is coupled to the second integrated processor. Also, a storage switch is contemplated employing one or more line cards (or "blades") which include the apparatus. The storage switch further includes at least one switch fabric card coupled to the at least one line card, wherein the switch fabric card is configured to route packets from the at least one line card and from one or more storage devices on a switch fabric.

In another embodiment, an apparatus includes a first system on a chip (SOC), a second SOC, and a security processor. The first SOC includes one or more network interface circuits, a second interface circuit, and at least a first processor. The first processor is programmed, during use, to process unencrypted packets received on the one or more network interface circuits. Additionally, the first processor is programmed, during use, to detect encrypted packets received on the one or more network interface circuits and to route the encrypted packets to the second interface circuit. The second SOC includes the second interface circuit coupled to the second interface circuit of the first SOC. Additionally, the second SOC includes at least a second processor and one or more network interface circuits configurable as a packet interface. The security processor is coupled to the packet interface, wherein the second processor is programmed, during use, to decrypt encrypted packets in cooperation with the security processor.

BRIEF DESCRIPTION OF THE DRAWINGS

The following detailed description makes reference to the accompanying drawings, which are now briefly described.

Figure 1:
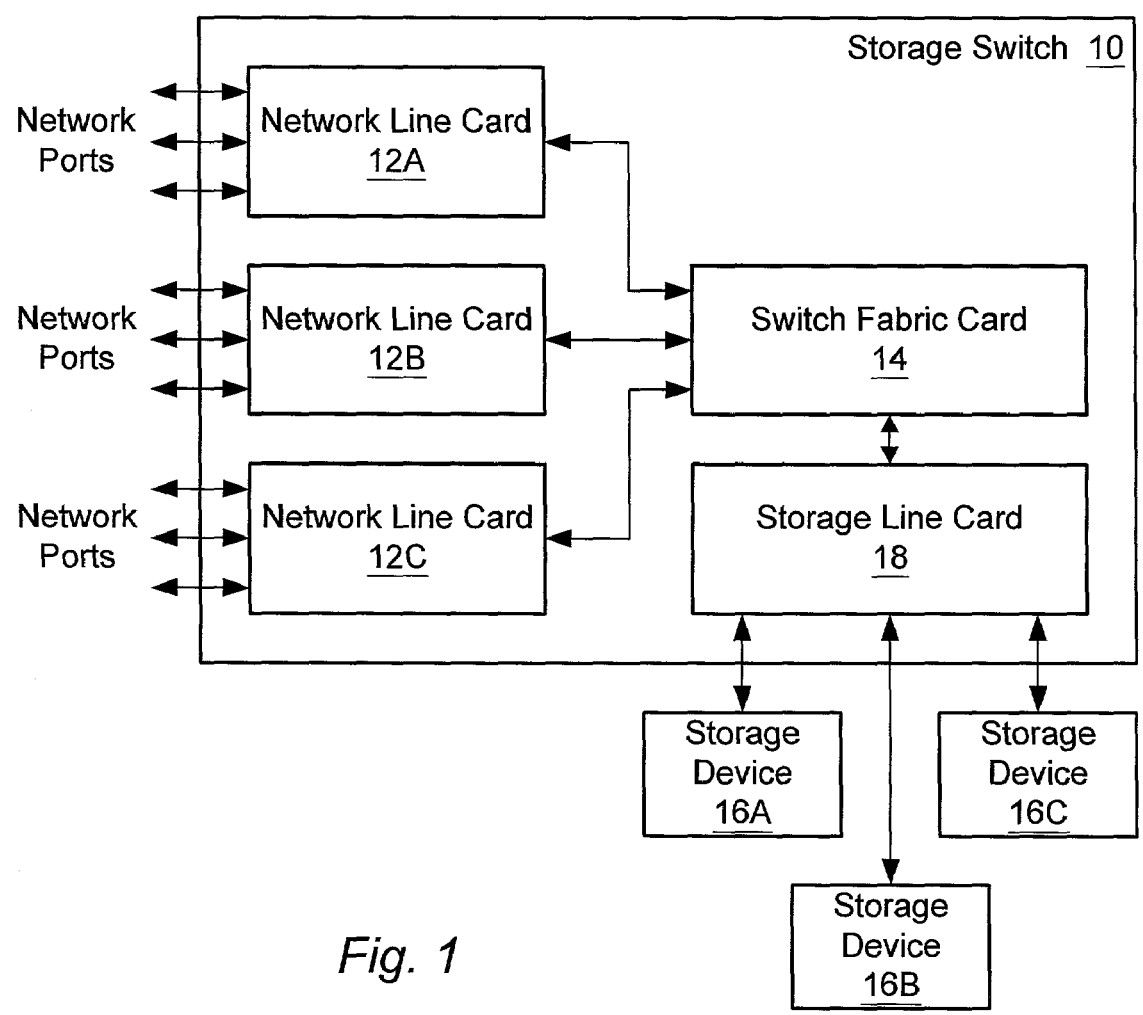
FIG. 1 is a block diagram of one embodiment of a storage switch.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a storage switch 10 is shown. Other embodiments are possible and contemplated. In the embodiment of FIG. 1, the storage switch 10 includes one or more network line cards (e.g. the network line cards 12A-12C in FIG. 1), one or more switch fabric cards (e.g. the switch fabric card 14 in FIG. 1), and one or more storage line cards (e.g. the storage line card 18 in FIG. 1). The storage switch 10 may be coupled to one or more network ports. The network ports may support any network protocol in various embodiments (e.g. Ethernet, asynchronous transfer mode (ATM), synchronous optical network (SONET), etc.). Specifically, the network line cards 12A-12C may each be used to couple to one or more network ports. The network line cards 12A-12C are also coupled, via a switch fabric, to the switch fabric card 14, which is further coupled through the storage line card 18 to a set of storage devices 16A-16C.

Generally, the storage switch 10 is coupled to receive storage request packets from various devices via the network ports, and to route the storage requests to the storage devices 16A-16C. Furthermore, the storage switch 10 may route the response packets from the storage devices 16A-16C back to the requesting devices on the network ports. The storage request packets and/or response packets may, in some cases, be encrypted and/or authenticated. For example, in one embodiment, encryption and/or authentication may be accomplished according to the IPsec standard set forth by the Internet Engineering Task Force (IETF) IPsec specification (RFC 2406 and RFC 2402). For example, the network ports which lead to transmission on the Internet may be encrypted to protect the data from observation by third parties while in transit and/or authenticated to verify the source and receiver of the data. If the data is to be routed on a network in a secure environment, encryption and/or authentication may not be used if desired. For example, ports which lead to transmission within the same building as the storage switch 10 and the storage devices 16A-16C may not be encrypted/authenticated if the building is physically secure (e.g. only authorized persons are allowed to enter the building).

The storage switch 10 may be configured for any type of storage. In one embodiment, the storage switch 10 may be an iSCSI switch. Thus, the packet traffic switched by the storage switch 10 may be TCP/IP packets containing SCSI commands and responses. In other embodiments, the storage switch 10 may be a storage area network (SAN) or network attached storage (NAS) switch. In still other embodiments, the storage switch 10 may be a switch for SCSI storage, IDE storage, or any other type of storage (e.g. Fibre Channel, Serial ATA, etc.).

The network line cards 12A-12C may generally provide the network connections for the storage switch 10. As used herein, a network line card is any collection of circuitry which provides one or more network interfaces for sending/receiving network traffic and the circuitry for processing traffic received on and transmitted on the interfaces. The circuitry may be arranged (e.g. on a printed circuit card or other supporting/interconnecting medium) to be inserted into a connector within the storage switch 10.

In the embodiment of FIG. 1, the network line cards 12A-12C may receive packets on the network ports, may process the packets (including optionally decrypting the packets if the packets are encrypted) and may transmit the packets to the switch fabric card 14 for routing to the destination storage device 16A-16C. Additionally, the network line cards 12A-12C may receive response packets from the switch fabric card 14, process the packets (including optionally encrypting the packets) and may transmit the packets on the appropriate network port.

The storage line card 18 may generally provide the storage interfaces from the storage switch 10 to the storage devices 16A-16C. One or more storage line cards 18 may be included to interface to different types of storage, or to provide multiple interfaces of a given type. The storage line card 10 may support any sort of storage interface, including any of the examples mentioned above. In some cases (e.g. interfacing to a NAS or SAN subsystem), the storage line card 18 may supply network ports (e.g. the storage line card 18 may be a network line card similar to network line cards 12A-12C).

The switch fabric card 14 includes circuitry which is used to switch packets from sources to destinations on the switch fabric that interconnects the network line cards 12A-12C and the storage devices 16A-16C. The switch fabric may include any communications medium. For example, between the network line cards 12A-12C and the switch fabric card 14 and between the storage line card 18 and the switch fabric card 14, interfaces such as SPI-4, Universal Test and Operations Physical Interface for ATM (UTOPIA) fabric, a common switch interface (CSIX) fabric, etc. may be used. The switch fabric card 14 may include various switch mechanisms (e.g. cross bars, point to point interfaces, meshes, cubes, etc.).

The storage devices 16A-16C may be any type of storage device (i.e. any type of device which may store data for later retrieval). For example, the storage devices 16A-16C may include fixed disk drives (e.g. SCSI drives, IDE drives, etc.), compact disc read only memory (CD-ROM) drives, writeable and/or rewriteable CD drives, digital versatile disk (DVD) drives, removable disk drives, etc. The storage devices 16A-16C may also include network attached storage (NAS) or storage area network (SAN) subsystems.

Figure 2:
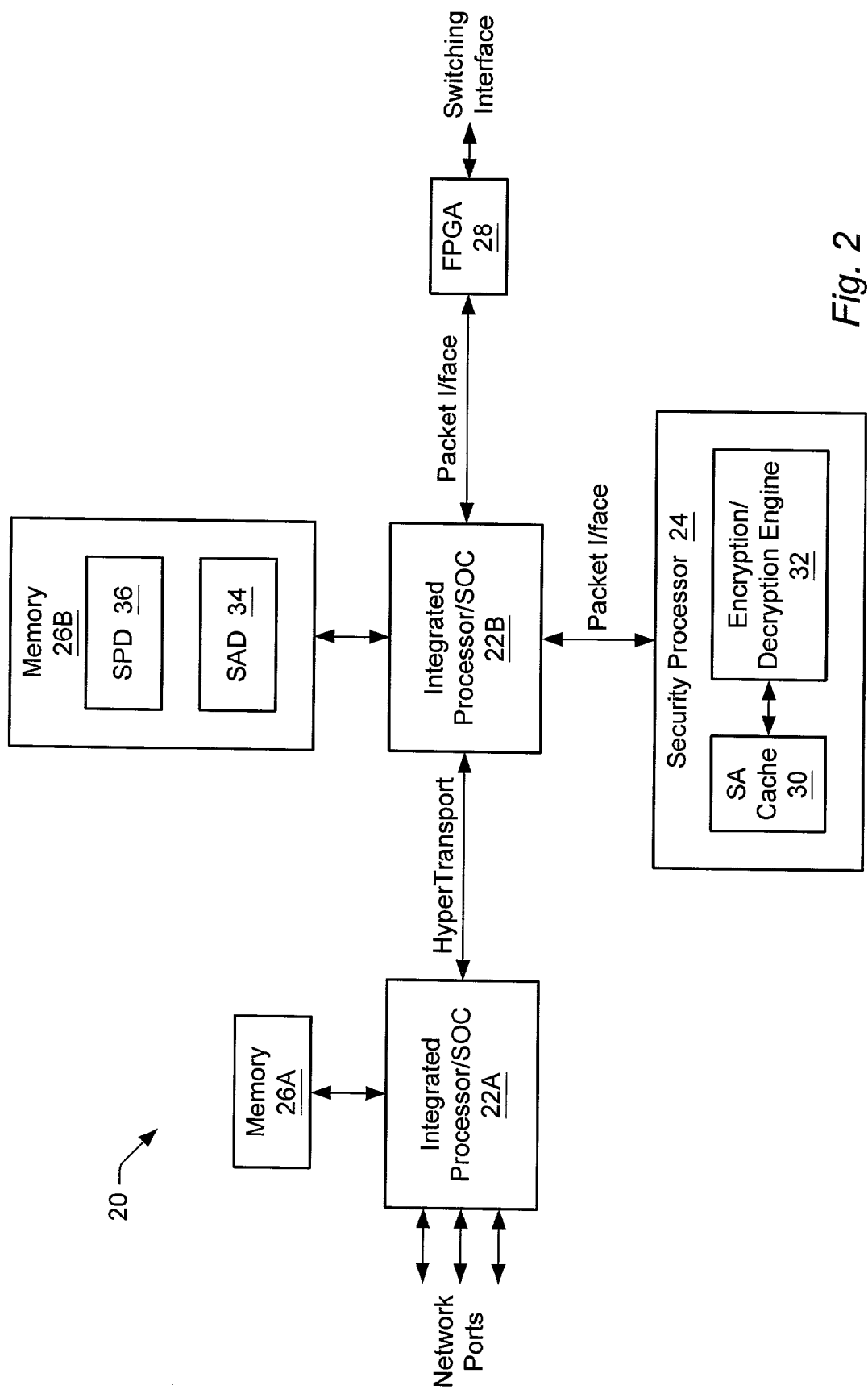
FIG. 2 is a block diagram of one embodiment of a circuitry for processing a mix of encrypted and unencrypted network traffic.

Turning now to FIG. 2, a block diagram illustrating one embodiment of a circuit 20 for processing a mix of encrypted and unencrypted network traffic is shown. Other embodiments are possible and contemplated. In one implementation, the circuit 20 may be included on each of the network line cards 12A-12C shown in FIG. 1. However, the circuit 20 may generally be used in any system in which processing of both encrypted and unencrypted network traffic is desired. In the embodiment of FIG. 2, the circuit 20 includes a first integrated processor or system on a chip (SOC) 22A, a second integrated processor/SOC 22B, a security processor 24, a first memory 26A coupled to the first integrated processor/SOC 22A, a second memory 26B coupled to the second integrated processor 22B, and a field programmable gate array (FPGA) 28. The first integrated processor/SOC 22A includes circuitry for providing a set of network ports (e.g. three network ports, in the illustrated embodiment, although the number of network ports may vary from as few as one to as many as desired) and also includes an interface to which the second integrated processor/SOC 22B is coupled. In the illustrated embodiment, the interface is the HyperTransport™ interface, although any interface may be used in other embodiments. The second integrated processor/SOC 22B further includes a pair of packet interfaces to which the security processor 24 and the FPGA 28 are coupled. The FPGA 28 is further coupled to a switching interface (e.g. an interface within the switch fabric managed by the switch fabric card 14 or managed by the integrated processor/SOC 22B in the embodiment of FIG. 1).

In one embodiment, one or both of the integrated processor/SOCs 22A-22B may be integrated processors. As used herein, an integrated processor includes processor circuitry (circuitry for executing instructions defined in a processor instruction set architecture) as well as at least one non-processor circuit integrated onto a single integrated circuit substrate (or "chip"). Alternatively, one or both of the integrated processor/SOCs 22A-22B may be a "system on a chip". As used herein, a system on a chip includes at least: one or more processors, a memory controller, and one or more input/output (I/O) interfaces (e.g. the network ports, the HyperTransport™ interface, generic packet interfaces, etc.). The SOC may optionally include caches and other circuitry integrated as well. For the remainder of this description, the integrated processor/SOCs 22A-22B will be referred to as integrated processors. However, it is understood that either or both may be an SOC in other embodiments. In some embodiments, the integrated processor/SOC 22B may integrate the security processor 24 as well.

The first integrated processor 22A is coupled to receive packets on the network ports coupled thereto. The received packets may be either encrypted or unencrypted. The first integrated processor 22A may process the unencrypted packets and may forward the processed packets through second integrated processor 22B to the switching interface. The first integrated processor 22A may pass the encrypted packets to the second integrated processor 22B, which may process the encrypted packets in cooperation with the security processor 24 and may transmit the decrypted packets on to the switching interface. Additionally, the second integrated processor 22B is coupled to receive packets from the switching interface, and may optionally encrypt the packets and transmit the packets to the first integrated processor 22A for transmission on the appropriate network port.

The circuitry 20 is programmable (e.g. both the integrated processors 22A-22B are programmable). Thus, the circuitry 20 may provide a programmable secure packet processing solution. Since at least some of the packet processing may be handled in software instructions executed on the integrated processors 22A-22B, the circuitry 20 may maintain compatibility with the IPsec standards (or other security standards) as those standards are modified over time by upgrading the software executed by the circuitry 20. Similarly, the circuitry 20 may be programmed for new standards that may be released after the circuitry 20 is placed in service. The circuitry 20 may also support standards that include security (e.g. the iSCSI standard).

Generally, as used herein, a security processor is any circuitry designed to perform one or more aspects of secure packet processing. For example, in the present embodiment, the security processor 24 may be designed to decrypt encrypted packets and to encrypt non-encrypted packets. In one specific embodiment, the security processor 24 may be designed to perform encryption/decryption and authentication of packets according to the IPsec specification. Any of a variety of encryption and/or authentication algorithms may be supported, e.g. as per the above mentioned RFCs.

In one implementation, the security processor 24 may include a security association (SA) cache 30 and an encryption/decryption engine 32. The SA cache 30 may be configured to store various security association parameters for use in decryptingl/encrypting packets. The SA cache 30 may be programmable from the integrated processor 22B via commands over the packet interface. The security associations stored in the SA cache 30 may be read from a security association database (SAD) 34 stored in the memory 26B, which may also be storing a security policy database (SPD) 36. The encryption/decryption engine 32 includes the circuitry for performing encryption and decryption (and/or authentication) in response to a given security association and packet. In one particular implementation, the security processor 24 may comprise the BCM5840 available from Broadcom Corporation.

As defined in the IPsec specification, a security association is a simplex connection between a source and a destination for which various security protocols may be applied to the communication from the source to the destination. For example, the IPsec specification currently includes an authentication header (AH) protocol that provides authentication and an encapsulating security payload (ESP) protocol that provides for both authentication and encryption. The security association may include one or the other of the AH or ESP protocols. The SAD 34 may be a database of parameters corresponding to active security associations, a subset of which may be cached in the SA cache 30. The parameters may include a variety of information used in maintaining the security association and used in the underlying protocols (e.g. a sequence number, an overflow flag for the sequence number, an indicator of the authentication algorithm and any cryptographic keys (e.g. public or private keys) used in the authentication algorithm, an indication of the encryption algorithm and any cryptographic keys used in the encryption algorithm, a lifetime value indicating how long the security association is valid, the protocol mode such as tunnel, transport, etc., etc.). The SPD 36 may be used to map various packets to a security policy, which may include one or more of the security association in the SAD 34 (or to indicate that the packet bypasses IPsec) as well as other security features such as the types of communications permitted, which devices communication is permitted with, etc. Various values may be used in the security policies (e.g. source and/or destination IP addresses, name, data sensitivity level, transport layer protocol, source and/or destination ports (e.g. UDP or TCP ports), etc.) to identify which security policy is to be used for a given packet.

While the above description (and the example shown in the flowcharts below) refers to the first integrated processor 22A performing the protocol processing of unencrypted packets and the second integrated processor 22B performing the protocol processing of encrypted packets, other embodiments may share the protocol processing of unencrypted packets and/or encrypted packets between the two integrated processors, if desired.

The SAD 34 and the SPD 36 may be examples of security databases. As used herein, a security database may be any database storing information used to provide secure packet transport.

In the illustrated embodiment, the FPGA 28 is used to translate the packet interface from the integrated processor 22B to the switching interface. The FPGA 28 is an optional component which may not be used, e.g., if the integrated processor 22B directly supports the switching interface employed in a given embodiment. Alternatively, any other circuitry may be used for translating from an interface supported by the integrated processor 22B to the switching interface.

It is noted that, while packet interfaces are used between the FPGA 28 and the second integrated processor 22B and between the security processor and the second integrated processor 22B, in other embodiments any interface may be used. As used herein, a packet interface refers to any interface which supports the transmission of packets directly thereon.

Turning next to FIGS. 3-7, a set of flowcharts are shown illustrating various operations of one embodiment of the integrated processors 22A-22B for processing packets. More particularly, the flowcharts of FIGS. 3-7 may represent the operation of integrated processors 22A-22B when executing sets of instructions programmed for the integrated processors. The sets of instructions may be stored on any suitable computer readable medium. For example, the instructions may be in the memories 26A-26B (depending on which integrated processor 22A-22B is to execute the instructions). Alternatively, the instructions may be stored on any medium (e.g. a ROM or other storage device) coupled to be accessed by the integrated processor 22A-22B.

Figure 3:
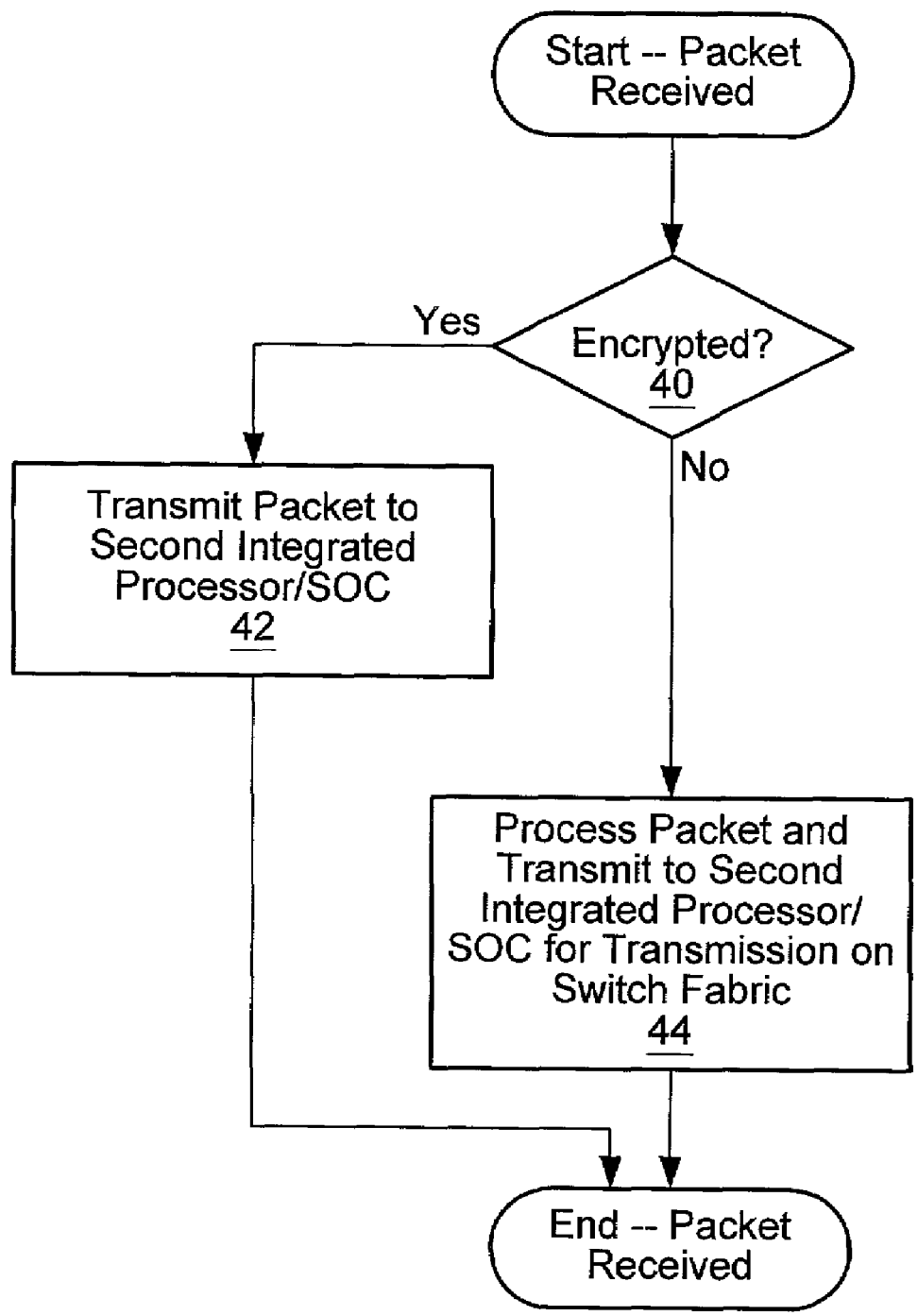
FIG. 3 is a flowchart illustrating operation of one embodiment of a first integrated processor/SOC shown in FIG. 2 in response to receiving a packet.

FIG. 3 is a flowchart illustrating operation of one embodiment of the first integrated processor 22A in response to receiving a packet on one of the network ports. Other embodiments are possible and contemplated. While the blocks are shown in a particular order for ease of understanding, other orders may be used as desired.

The first integrated processor 22A examines the received packet to determine if the packet is encrypted (decision block 40). The determination of whether a packet is encrypted or not may vary depending on the security protocols being used. For the IPsec standard, the protocol header of the packet which precedes the security header specified for the ESP or AH protocols includes a value of 50 in its protocol field (IPv4) or its next header field (IPv6) to indicate ESP or a value of 51 to indicate AH. If either of these protocols is selected, the first integrated processor 22A may assume the packet is encrypted (and/or requires authentication processing). Alternatively, the first integrated processor 22A may have access to the SAD 34, and may lookup the security association for the packet to determine if the packet is encrypted. Any mechanism for determining if the packet is encrypted may be used.

If the packet is encrypted (and/or authhenticated), the first integrated processor 22A transmits the packet to the second integrated processor 22B for decryption and further processing (block 42). On the other hand, if the packet is not encrypted, the first integrated processor 22A may perform protocol processing on the packet and may transmit the processed packet to the second integrated processor 22B for transmission on the switch fabric (block 44). The protocol processing may include, for example, determining the target of the packet on the switch fabric (e.g. a storage device in the embodiment of FIG. 1) and transmitting information to the switch fabric card indicating the target for routing of the packet to the target. The memory 26A may include various databases which may be used in the protocol processing (e.g. databases mapping IP addresses to switch fabric addresses or other routing information).

Figure 4:
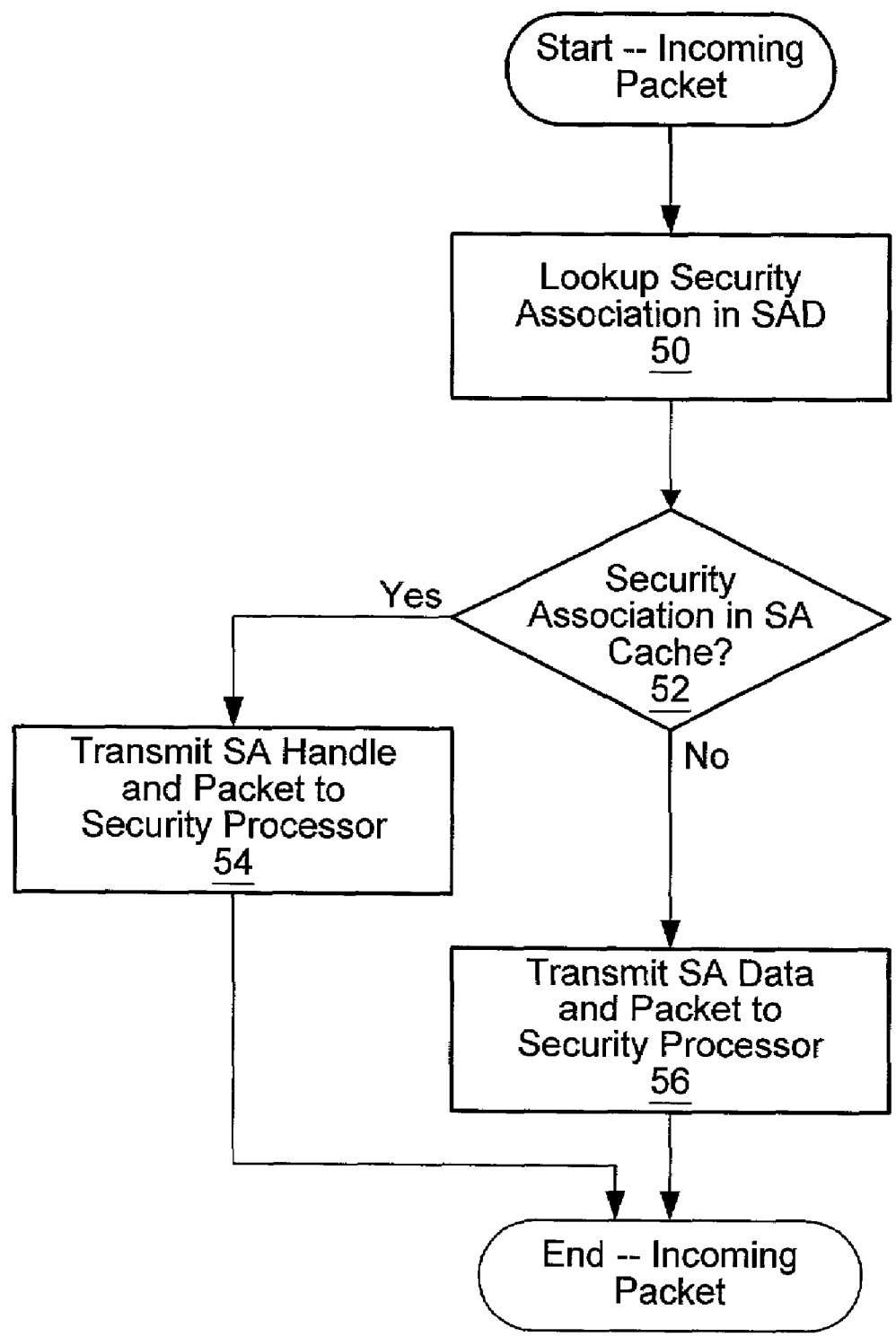
FIG. 4 is a flowchart illustrating operation of one embodiment of a second integrated processor/SOC shown in FIG. 2 in response to receiving an incoming packet from the first integrated processor/SOC.

Turning now to FIG. 4, a flowchart is shown illustrating operation of one embodiment of the second integrated processor 22B in response to receiving an incoming (encrypted) packet from the first integrated processor 22A. Other embodiments are possible and contemplated. While the blocks are shown in a particular order for ease of understanding, other orders may be used as desired.

The second integrated processor 22B may use various information from the incoming packet to lookup a security association in the SAD 34 corresponding to the packet (block 50). Depending on the security protocol, various information may be used. In one embodiment employing the IPsec standard, the packet may include an indication of the security protocol being used (e.g. AH or ESP), a security parameter index (SPI) included in the security header, and an IP destination address (in the IP header). These three values maybe used to identify a security association, and thus an entry in the SAD 34.

Among other things, the SAD entry may include an indication of whether or not the parameters in the entry are cached in the SA cache 30 of the security processor 24. If the parameters are cached, the SAD entry may further include a value identifying the entry in the SA cache (referred to as the SA handle herein). Generally, the second integrated processor 22B may encapsulate the incoming packet with: (i) a control word indicating the control fields that follow, and (ii) the control fields. In particular, the control fields may include the security association parameters (cryptographic keys, encryption algorithms used, etc.) if the security association is not cached in the SA cache, or the SA handle if the security association is cached in the SA cache.

The second integrated processor 22B may examine the indication to determine if the security association is cached in the SA cache (decision block 52). If so, the second integrated processor 22B may encapsulate the incoming packet with: (i) a control word indicating that an SA handle is included, and (ii) the SA handle. The second integrated processor 22B may transmit the encapsulated packet to the security processor 24 (block 54). If the indication indicates that the security association is not cached in the SA cache, the second integrated processor 22B may encapsulate the incoming packet with: (i) a control word indicating that the SA parameters are included, and (ii) the SA parameters ("SA data" in FIG. 4). The second integrated processor 22B may transmit the encapsulated packet to the security processor 24 (block 56).

Figure 5:
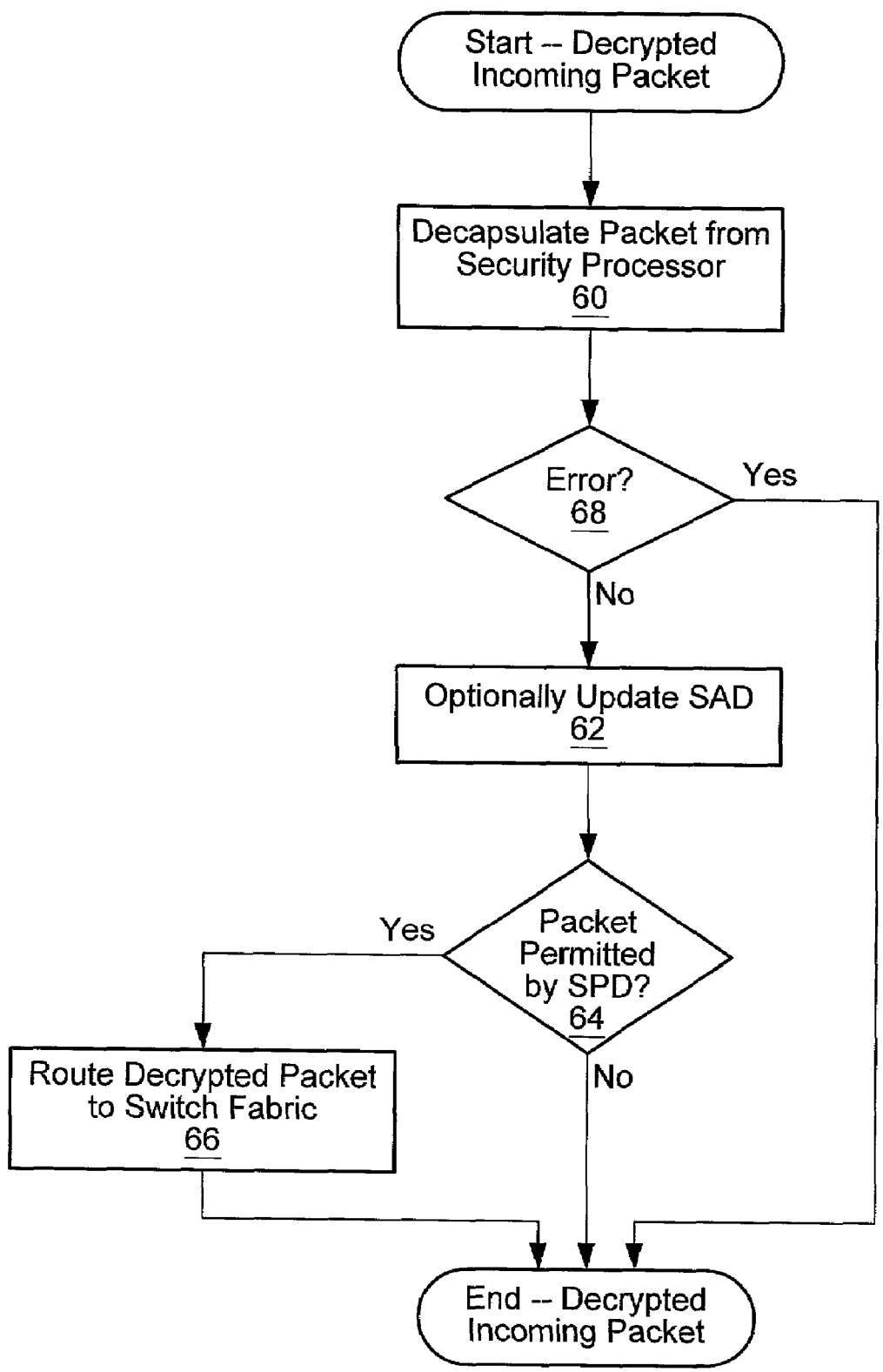
FIG. 5 is a flowchart illustrating operation of one embodiment of the second integrated processor/SOC in response to receiving a decrypted incoming packet from a security processor shown in FIG. 2.

Once the security processor 24 has completed processing the packet (decrypting the packet and/or authenticating the packet according to the AH or ESP protocol used for the packet), the security processor 24 returns the decrypted incoming packet to the second integrated processor 22B. FIG. 5 is a flowchart illustrating operation of one embodiment of the second integrated processor 22B in response to receiving a decrypted incoming packet from the security processor 24. Other embodiments are possible and contemplated. While the blocks are shown in a particular order for ease of understanding, other orders may be used as desired.

The security processor 24 may encapsulate the decrypted packet with a control word and various control fields, similar to encapsulation of packets transmitted to the security processor 24. For example, the security processor 24 may return packet status indicating whether or not an error was detected in the packet, whether or not the packet has been dropped, etc. The second integrated processor 22B may decapsulate the packet (block 60). In one embodiment, the second integrated processor 22B check for errors in the status from the security processor (decision block 68). If errors are detected (processing errors, an indication to drop the packet, etc.), the second integrated processor 22B may drop the packet or otherwise respond to the error (not shown in FIG. 5). If no errors were detected, the second integrated processor 22B may optionally update the SAD 34, depending on the contents thereof and the result of the processing by the security processor 24 (block 62).

The second integrated processor 22B may also lookup the security policy or policies corresponding to the packet in the SPD 36 to verify that the packet is permitted to pass to the switch fabric by the security policies (decision block 64). If so, the second integrated processor may perform protocol processing on the decrypted packet (similar to the description of the first integrated processor 22A above with respect to FIG. 3) and may route the decrypted packet onto the switch fabric (block 66). On the other hand, if the packet is not permitted according to the security policies, the packet may be dropped (i.e. the second integrated processor 22B may take no further action with the packet).

Figure 6:
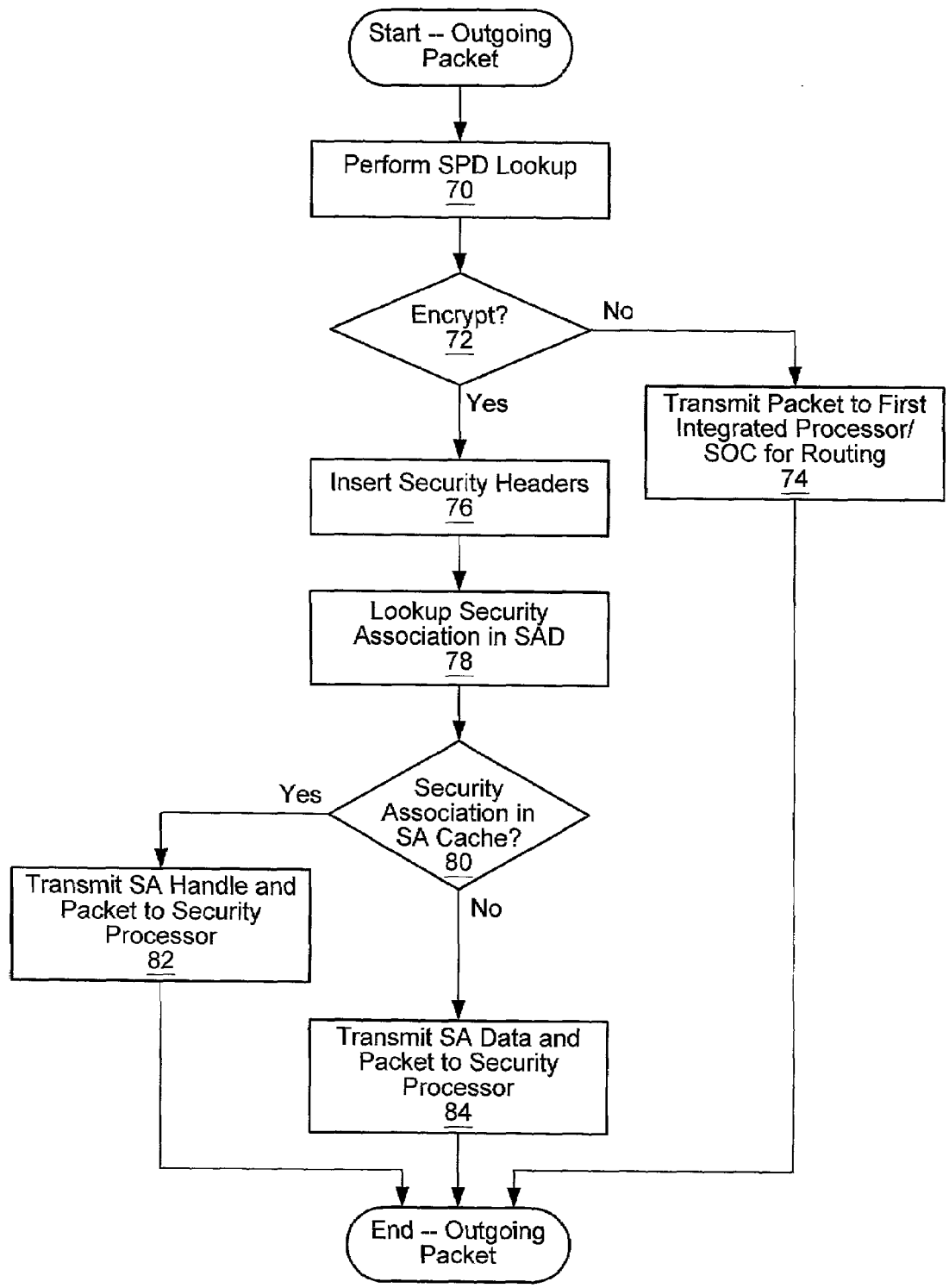
FIG. 6 is a flowchart illustrating operation of one embodiment of the second integrated processor/SOC in response to receiving an outgoing packet.

As mentioned above, the second integrated processor 22B may also receive packets from the switch fabric to be transmitted on one of the network ports of the first integrated processor 22A ("outgoing packets"). FIG. 6 is a flowchart illustrating operation of one embodiment of the second integrated processor 22B in response to receiving an outgoing packet from the switch fabric. Other embodiments are possible and contemplated. While the blocks are shown in a particular order for ease of understanding, other orders may be used as desired.

The second integrated processor 22B may perform a lookup in the SPD 36 for the outgoing packet (block 70). The second integrated processor 22B may determine, from the SPD lookup, whether or not the outgoing packet is to be encrypted (or authenticated) or whether the packet bypasses the security protocols (e.g. if the packet is being transmitted in a secure network). If the packet is not to be encrypted (or authenticated) (decision block 72, "no" leg), the second integrated processor 22B transmits the outgoing packet to the first integrated processor 22A (block 74).

On the other hand, if the packet is to be encrypted/authenticated (decision block 72, "yes" leg), the second integrated processor 22B may insert the security headers for the selected security protocol (e.g. ESP headers or AH headers, for IPsec implementations) (block 76). Additionally, the second integrated processor 22B may lookup the security association for the packet in the SAD 34 (block 78). If the security association parameters are cached in the SA cache 30 (decision block 80, "yes" leg), the second integrated processor 22B may encapsulate the outgoing packet with: (i) a control word indicating that the SA handle is included, and (ii) the SA handle. The second integrated processor 22B may transmit the encapsulated packet to the security processor 24 (block 82). On the other hand, if the security association parameters are not cached in the SA cache 30 (decision block 80, "no" leg), the second integrated processor 22B may encapsulate the outgoing packet with: (i) a control word indicating that the SA parameters are included, and (ii) the SA parameters (SA data in FIG. 6). The second integrated processor 22B may transmit the encapsulated packet to the security processor 24 (block 84).

Figure 7:
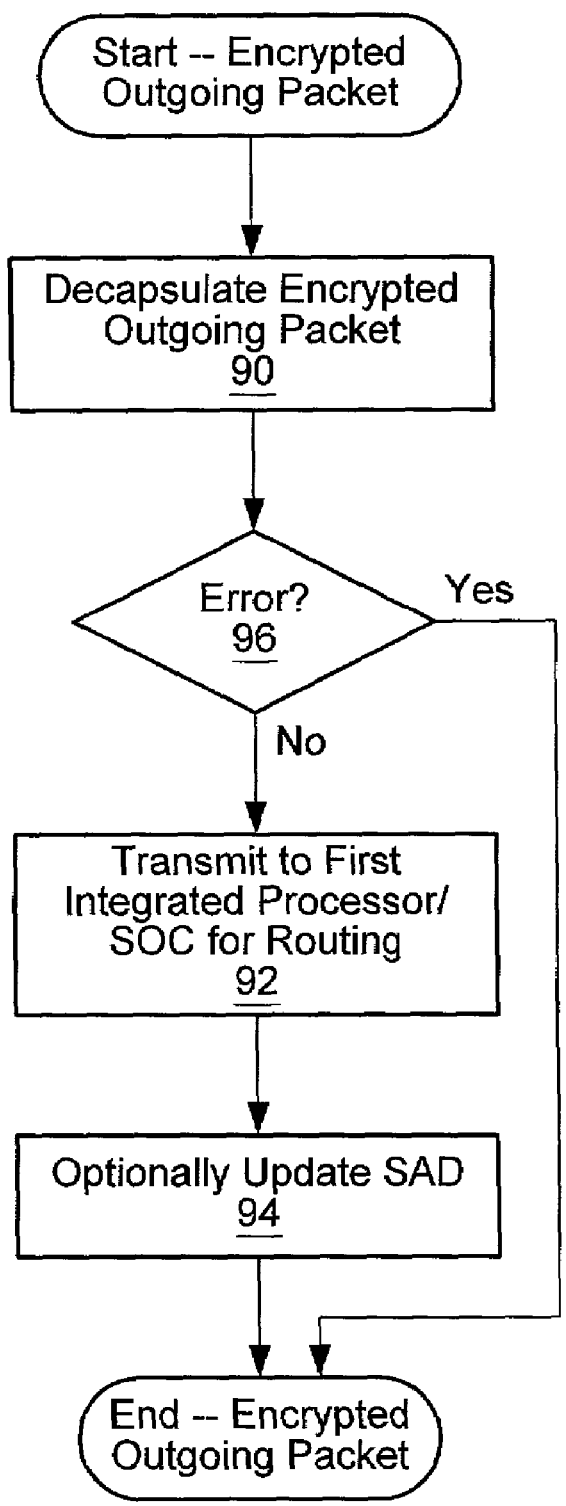
FIG. 7 is a flowchart illustrating operation of one embodiment of the second integrated processor/SOC in response to receiving an encrypted outgoing packet from the security processor.

Once the security processor 24 has completed encrypting/authenticating the outgoing packet, the security processor 24 may return the encrypted outgoing packet to the second integrated processor 22B. FIG. 7 is a flowchart illustrating operation of one embodiment of the second integrated processor 22B in response to receiving an encrypted outgoing packet from the security processor 24. Other embodiments are possible and contemplated. While the blocks are shown in a particular order for ease of understanding, other orders may be used as desired.

The second integrated processor 22B may decapsulate the encrypted outgoing packet from the security processor (block 90) and may check for any errors reported by the security processor (decision block 96). Assuming no errors have occurred, the second integrated processor 22B may transmit the encrypted outgoing packet to the first integrated processor 22A for routing on one of the network ports (block 92). Additionally, the second integrated processor 22B may optionally update the SAD 34 (block 94). For example, a sequence number may be assigned to the outgoing packet. The SAD 34 may be updated with the sequence number, so that the next higher sequence number may be assigned to the next outgoing packet that uses the same security association. If errors have occurred, the second integrated processor 22B may drop the packet or otherwise response to the errors (not shown in FIG. 7).

While some of the above embodiments have included the possibility of both encryption and authentication (or one or the other) in the security processor 24, other embodiments are contemplated in which only encryption or only authentication are handled in the security processor 24.

Figure 8:
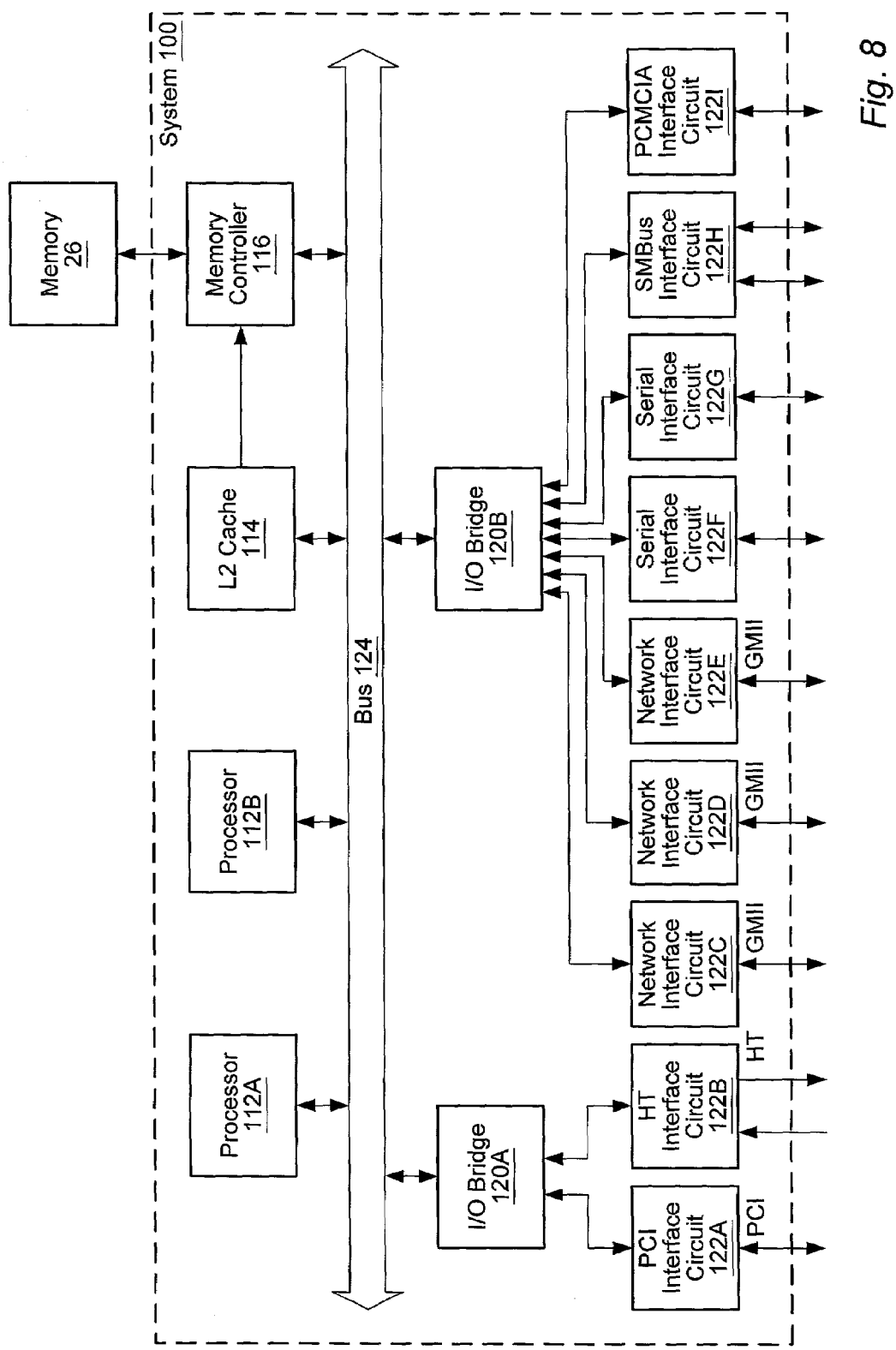
FIG. 8 is a block diagram of one embodiment of an integrated processor/SOC.

Turning now to FIG. 8, a block diagram of one embodiment of a system 100 is shown. Other embodiments are possible and contemplated. In one embodiment, the system 100 may be used as an SOC for either of the first SOC 22A or the second SOC 22B, or both. In the embodiment of FIG. 8, the system 100 includes processors 112A-112B, an L2 cache 114, a memory controller 116, a pair of input/output (I/O) bridges 120A-120B, and various I/O interface circuits 122A-122I. The system 100 may include a bus 124 for interconnecting the various components of the system 100. As illustrated in FIG. 8, each of the processors 112A-112B, the L2 cache 114, the memory controller 116, and the I/O bridges 120A-120B are coupled to the bus 124. Thus, each of the processors 112A-112B, the L2 cache 114, the memory controller 116, and the I/O bridges 120A-120B may be an agent on the bus 124 for the illustrated embodiment. The I/O bridge 120A is coupled to the I/O interface circuits 122A-122B (specifically, in the illustrated embodiment, a Peripheral Component Interconnect (PCI) interface circuit 122A and a HyperTransport™ (HT) interface circuit 122B (where the HT interface was previously referred to as the Lightning Data Transport (LDT)™ interface), and the I/O bridge 120B is coupled to the I/O interface circuits 122C-122I (specifically, in the illustrated embodiment, three network interface circuits 122C-122E, two serial interface circuits 122F-122G, a system management bus (SMBus) Interface circuit 122H, and a Personal Computer Memory Card International Association (PCMCIA) Interface circuit 122I). The L2 cache 114 is coupled to the memory controller 116, which is further coupled to a memory 26.

The processors 112A-112B may be designed to any instruction set architecture, and may execute programs written to that instruction set architecture. Exemplary instruction set architectures may include the MIPS® instruction set architecture (including the MIPS-3D™ and MIPS MDMX™ application specific extensions), the IA-32 or IA-64 instruction set architectures developed by Intel Corp., the PowerPC™ instruction set architecture, the Alpha instruction set architecture, the ARM instruction set architecture, or any other instruction set architecture. While the system 100 as shown in FIG. 8 includes two processors, other embodiments may include one processor or more than two processors, as desired.

The L2 cache 114 is a high speed cache memory. The L2 cache 114 is referred to as "L2" since the processors 112A-112B may employ internal level 1 ("L1") caches. If L1 caches are not included in the processors 112A-112B, the L2 cache 114 may be an L1 cache. Furthermore, if multiple levels of caching are included in the processors 112A-112B, the L2 cache 114 may be an outer level cache than L2.

While the L2 cache 114 is labeled L2 with respect to it position in the processor cache hierarchy, the L2 cache 114 may actually service cacheable transactions from any device on the bus 124. Thus, the L2 cache 114 may be viewed as part of a memory subsystem including the memory controller 116 (and the memory 26 coupled thereto). If a cacheable read transaction hits in the L2 cache 114, even if the source of the read transaction is an I/O interface circuit 122A-122I, the L2 cache 114 supplies the data for the read transaction. If a cacheable write transaction hits in the L2 cache 114, even if the source of the write transaction is an I/O interface circuit 122A-122I, the L2 cache 114 updates with the data for the write transaction.

The L2 cache 114 may employ any organization, including direct mapped, set associative, and fully associative organizations. In one particular implementation, the L2 cache 114 may be a set associative cache having 32 byte cache blocks. A set associative cache is a cache arranged into multiple sets, each set comprising two or more entries. A portion of the address (the "index") is used to select one of the sets (i.e. each encoding of the index selects a different set). The cache block storage locations in the selected set are eligible to store the cache block accessed by the address. Each of the cache block storage locations within the set is referred to as a "way" of the set. The portion of the address remaining after removing the index (and the offset within the cache block) is referred to as the "tag", and is stored in each cache block storage location to identify the cache block in that entry. The stored tags are compared to the corresponding tag portion of the address of a memory transaction to determine if the memory transaction hits or misses in the cache, and is used to select the way in which the hit is detected (if a hit is detected).

The memory controller 116 is configured to access the memory 26 (which may be the memory 26A or 26B shown in FIG. 2, in some embodiments) in response to memory transactions received on bus 124. The memory controller 116 receives a hit signal from the L2 cache 114, and if a hit is detected in the L2 cache 114 for a memory transaction, memory controller 116 does not respond to that memory transaction. Other embodiments may not include the L2 cache 114 and the memory controller 116 may respond to each memory transaction. If a miss is detected by the L2 cache 114, or the memory transaction is non-cacheable, the memory controller 116 may access the memory 26 to perform the read or write operation. The memory controller 116 may be designed to access any of a variety of types of memory. For example, the memory controller 116 may be designed for synchronous dynamic random access memory (SDRAM), and more particularly double data rate (DDR) SDRAM. Alternatively, the memory controller 116 may be designed for DRAM, Rambus DRAM (RDRAM), SRAM, fast cycle RAM (FCRAM), reduced latency DRAM (RLDRAM), or any other suitable memory device.

The I/O bridges 120A-120B link one or more I/O interface circuits (e.g. the I/O interface circuits 122A-122B for the I/O bridge 120A and the I/O interface circuits 122C-122I for I/O bridge 120B) to the bus 124. While I/O interface circuits are shown in FIG. 8, generally an I/O bridge 120A-120B may link one or more I/O interface circuits or I/O devices. The I/O bridges 120A-120B may serve to reduce the electrical loading on the bus 124 if more than one I/O interface circuit 122A-122I is bridged by that I/O bridge. Generally, the I/0 bridge 120A performs transactions on the bus 124 on behalf of the I/O interface circuits 122A-122B and relays transactions targeted at the I/O interface circuit 122A-122B from the bus 124 to that I/O interface circuit 122A-122B. Similarly, the I/O bridge 120B generally performs transactions on the bus 124 on behalf of the I/O interface circuits 122C-122I and relays transactions targeted at an I/O interface circuit 122C-122I from the bus 124 to that P(O interface circuit 122C-122I.

The PCI interface circuit 122A may be a circuit for interfacing to the PCI bus. In one embodiment, the PCI interface circuit 122A may implement the 66 MHz PCI specification version 2.2. The PCI interface circuit 122A may be configurable to be the host bridge on the PCI bus.

The HT interface circuit 122B may be a circuit for interfacing to the HT fabric. The HT interface circuit 122B may be the host bridge on the HT fabric.

The network interface circuits 122C-122E may each include Ethernet Media Access Controllers (MACs), in one embodiment. Thus, the network interface circuits 122C-122E may interface externally to the Media Independent Interface (MII) or the Gigabit MH (GMII) interface. Alternatively, the external interface may be a generic packet interface in which either the start or end of packets is flagged using control signals on the interface. In yet another alternative, the three network interface circuits 122C-122E may be operable as two wider packet interfaces (e.g. 16 bit interfaces, if the individual MII/GMII interfaces are 8 bits). The network interface circuits 122C-122E may be configurable (e.g. during reset) to operate the interface in any of the above modes. The network interface circuits 122C-122E may alternatively include the physical portion of the Ethernet interface and interface directly to an Ethernet physical medium (e.g. twisted pair, fiber optic, etc.). Still further, other embodiments may support any network interface (e.g. X.25, Frame Relay, Asynchronous Transfer Mode (ATM), etc.). In one implementation, the network interface circuits 122C-122E may interface to the network ports shown in FIGS. 1 and 2. The network interface circuits 122C-122E may also be configured as the packet interfaces shown in FIG. 2.

The serial interface circuits 122F-122G may support dual serial interfaces. The serial interfaces may be operated synchronously, and may also include a dual universal asynchronous receiver/transmitter (DUART) for dual asynchronous operation. The SMBus Interface circuit 122H supports the SMBus interface, and the PCMCIA interface circuit 122I supports the PCMCIA interface. Additionally, a generic bus and general purpose I/O may be supported (not shown).

While a specific set of I/O interface circuits 122A-122I are shown, other embodiments may use any subsets or supersets of the set shown. Furthermore, other embodiments may include any set of I/O interface circuits/devices, as desired.

The bus 124 may be a split transaction bus, in one embodiment. The bus 124 may employ a distributed arbitration scheme, in one embodiment. In one embodiment, the bus 124 may be pipelined. The bus 124 may employ any suitable signalling technique. For example, in one embodiment, differential signalling may be used for high speed signal transmission. Other embodiments may employ any other signalling technique (e.g. TTL, CMOS, GTL, HSTL, etc.).

It is noted that the system 100 (and more particularly the processors 112A-112B, the L2 cache 114, the memory controller 116, the I/O interface circuits 122A-122I, the I/O bridges 120A-120B and the bus 124) may be integrated onto a single integrated circuit as a system on a chip configuration. Generally, one or more processors 112A-112B and any other components may be integrated to form an integrated processor. One embodiment of a system 100 integrated onto a single integrated circuit may be the BCM1250 available from Broadcom Corporation (Irvine, Calif.). In another configuration, the memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 124 may not be pipelined, if desired.

It is noted that, while FIG. 8 illustrates the I/O interface circuits 122A-122I coupled through the I/O bridges 120A-120B to the bus 124, other embodiments may include one or more I/O interface circuits directly coupled to the bus 124, if desired.

While a shared bus is used in the present embodiment, any sort of interconnect may be used in other embodiments (e.g. crossbar connections, point to point connections in a ring, star, or any other topology, meshes, cubes, etc.). Generally, an interconnect is any sort of communication medium.

Figure 9:
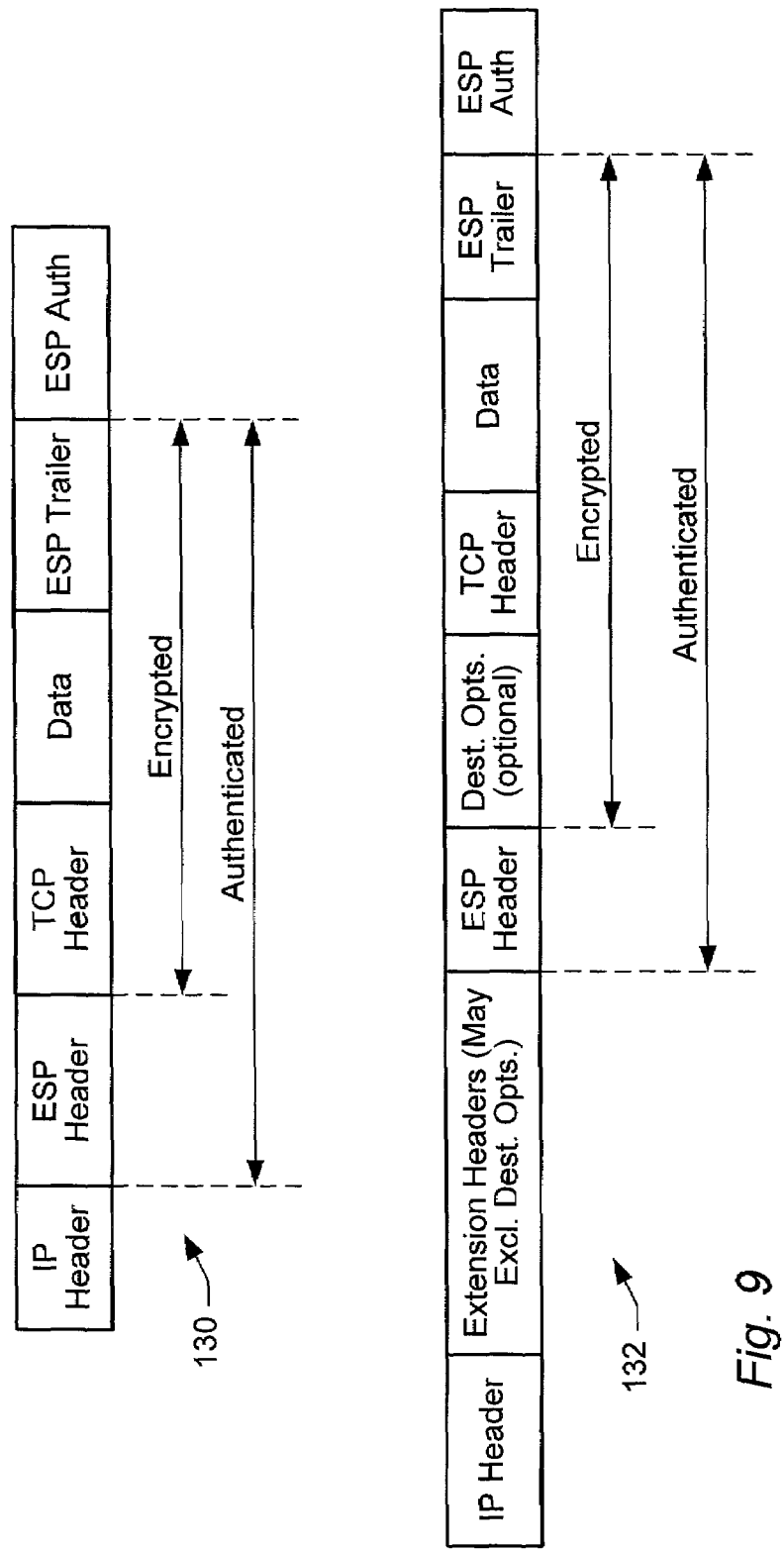
FIG. 9 is a block diagram illustrating one embodiment of encrypted packets.

Turning now to FIG. 9, a block diagram illustrating one embodiment of an encrypted IPv4 packet 130 and an encrypted IPv6 packet 132 is shown. Other embodiments are possible and contemplated. In the illustrated embodiment, the packets are encrypted using the ESP protocol specified in the IPsec standard. Other embodiments may use other encryption protocols/standards.

The packet 130 includes an IP header, an ESP header, a TCP header, data, an ESP trailer, and an ESP authentication trailer ("ESP Auth" in FIG. 9). The IP header may be the standard IP header (including source and destination IP addresses, etc.). The ESP header may be a security header and may include, for example, the security parameters index (SPI) and the sequence number assigned to the packet, as described above. The TCP header may be the standard TCP header, and the data may be the data transmitted in the packet. The ESP trailer may include optional padding (which may be used in certain encryption algorithms which encrypt fixed sized blocks, for example). The ESP trailer may also include the pad length and a next header field. Finally, the ESP authentication field may include authentication data. For example, the authentication data may include an integrity check value (ICV) calculated over other fields of the packet. As illustrated underneath the packet 130 in FIG. 9, the TCP header, the data, and the ESP trailer may be encrypted fields in the packet 130. The ESP header, the TCP header, the data, and the ESP trailer may be authenticated by the ICV value in the ESP authentication field.

The packet 132 includes the IP header, ESP header, TCP header, data, ESP trailer, and ESP authentication field, similar to the packet 130. However, the packet 132 also includes an optional extension header, and an optional destination options field (Dest. Opts. in FIG. 9) as specified in IPv6. As shown in FIG. 9, the ESP header follows the extension headers and may be before the destination options header or after it. If the destination options header follows the ESP header, it is encrypted along with the TCP header, the data, and the ESP trailer. If the destination options header follows the ESP header, it is authenticated along with the ESP header, the TCP header, the data, and the ESP trailer.

The packets 130 and 132 shown in FIG. 9 are transport mode packets. The ESP protocol may also be used with tunnel mode packets. In tunnel mode packets, there is an "inner" IP header (after the ESP header but before the TCP header) which includes the ultimate source and destination IP addresses which are being tunneled between the source IP address and the destination IP address in the "outer" IP header (the header shown in FIG. 9). Accordingly, the inner IP header is encrypted and authenticated.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a first integrated processor having one or more network interfaces to receive incoming encrypted and unencrypted packets, in which the first integrated processor is to be programmed, during use, to perform protocol processing of unencrypted packets received on the one or more network interfaces and programmed to detect encrypted packets received on the one or more network interfaces, the first integrated processor to also transmit outgoing encrypted and unencrypted packets onto the one or more network interfaces;
   a second integrated processor coupled to the first integrated processor to receive the protocol processed incoming unencrypted packets and to transfer the protocol processed unencrypted packets onto a switch fabric, the second integrated processor to receive the incoming encrypted packets and determine a security association for the incoming encrypted packets in order to have the incoming encrypted packets decrypted, the second processor to also receive outgoing packets from the switch fabric, in which the second processor is to transfer outgoing packets that are not to be encrypted to the first processor and to have processed outgoing packets that are to be encrypted prior to transfer to the first processor;
   a security processor coupled to the second integrated processor to receive the incoming encrypted packets and the security association and to decrypt the encrypted packets for transfer back to the second processor to determine if the decrypted incoming packets are to be coupled to the switch fabric, the security processor to also receive outgoing packets that are to be encrypted and to encrypt the outgoing packets prior to transfer back to the second processor; and
   the first integrated processor, the second integrated processor and the security processor to reside on a line card that is to be disposed between a data network and the switch fabric, in which the switch fabric is to be coupled to a plurality of storage devices.

2. The apparatus as recited in claim 1 further comprising a memory coupled to the second integrated processor, wherein the memory is to store one or more security databases during use.

3. The apparatus as recited in claim 2 wherein the security databases include a security association database storing security associations, wherein the second integrated processor is to lookup a first security association corresponding to a first encrypted packet in the security association database, and wherein the second integrated processor is to transmit the first encrypted packet and the first security association to the security processor for decryption.

4. The apparatus as recited in claim 3 wherein the security processor includes a security association cache to store security associations, and wherein the second integrated processor is to transmit an identifier of the first security association within the security association cache to the security processor instead of the first security association if the first security association is stored in the security association cache.

5. The apparatus as recited in claim 3 wherein the second integrated processor is to receive a second unencrypted packet from the switch fabric, and wherein the second integrated processor is to lookup a second security association in the security association database and to transmit the second unencrypted packet and the second security association to the security processor for encryption.

6. The apparatus as recited in claim 5 wherein the second integrated processor is configured to receive a second encrypted packet corresponding to the second unencrypted packet from the security processor, and wherein the second integrated processor is configured to transmit the second encrypted packet to the first integrated processor for transmission on one of the network interfaces.

7. The apparatus as recited in claim 1 wherein the one or more network interfaces comprise Ethernet interfaces.

8. The apparatus as recited in claim 1 wherein the security processor is to perform authentication processing on the incoming encrypted packets.

9. A storage switch comprising:
   at least one line card, each line card comprising:
      a first integrated processor having one or more network interfaces to receive incoming encrypted and unencrypted packets, in which the first integrated processor is to be programmed, during use, to perform protocol processing of unencrypted packets received on the one or more network interfaces and programmed to detect encrypted packets received on the one or more network interfaces, the first integrated processor to also transmit outgoing encrypted and unencrypted packets onto the one or more network interfaces, and in which the network interfaces comprising interfaces of the line card;

a second integrated processor coupled to the first integrated processor to receive the protocol processed incoming unencrypted packets and to transfer the protocol processed unencrypted packets onto a switch fabric, the second integrated processor to receive the incoming encrypted packets and determine a security association for the incoming encrypted packets in order to have the incoming encrypted packets decrypted, the second processor to also receive outgoing packets from the switch fabric, in which the second processor is to transfer outgoing packets that are not to be encrypted to the first processor and to have processed outgoing packets that are to be encrypted prior to transfer to the first processor; and a security processor coupled to the second integrated processor to receive the incoming encrypted packets and the security association and to decrypt the encrypted packets for transfer back to the second processor to determine if the decrypted incoming packets are to be coupled to the switch fabric, the security processor to also receive outgoing packets that are to be encrypted and to encrypt the outgoing packets prior to transfer back to the second processor;

at least one switch fabric card operable as the switch fabric and coupled to the at least one line card, wherein the switch fabric card is to route incoming and outgoing packets between the at least one line card and one or more storage devices coupled to the switch fabric.

10. The storage switch as recited in claim 9 wherein the incoming unencrypted and encrypted packets include commands to the storage devices.

11. The storage switch as recited in claim 9 wherein the security processor is to perform authentication processing on the packets.

12. An apparatus comprising:
a first system on a chip (SOC), including one or more network interface circuits and a first processor, in which the first processor is to receive incoming encrypted and unencrypted packets and to be programmed, during use, to perform protocol processing of unencrypted packets received on the one or more network interface circuits and programmed to detect encrypted packets received on the one or more network interface circuits, the first processor to also transmit outgoing encrypted and unencrypted packets onto the one or more network interface circuits;

a second SOC, including a second processor, coupled to the first SOC, in which the second processor is to receive the protocol processed incoming unencrypted packets and to transfer the protocol processed unencrypted packets onto a switch fabric, the second processor to receive the incoming encrypted packets and determine a security association for the incoming encrypted packets in order to have the incoming encrypted packets decrypted, the second processor to also receive outgoing packets from the switch fabric, in which the second processor is to transfer outgoing packets that are not to be encrypted to the first processor and to have processed outgoing packets that are to be encrypted prior to transfer to the first processor;

a security processor coupled to the second processor to receive the incoming encrypted packets and the security association and to decrypt the encrypted packets for transfer back to the second processor to determine if the decrypted incoming packets are to be coupled to the switch fabric, the security processor to also receive outgoing packets that are to be encrypted and to encrypt the outgoing packets prior to transfer back to the second processor; and the first SOC, the second SOC and the security processor to reside on a line card that is to be disposed between a data network and the switch fabric, in which the switch fabric is to be coupled to a plurality of storage devices.

13. The apparatus as recited in claim 12 further comprising a memory coupled to the second SOC, wherein the memory is to store one or more security databases during use.

14. The apparatus as recited in claim 13 wherein the security databases include a security association database storing security associations, wherein the second processor is programmed, during use, to lookup a first security association corresponding to a first encrypted packet in the security association database, and wherein the second processor is programmed, during use, to transmit the first encrypted packet and the first security association to the security processor for decryption.

15. The apparatus as recited in claim 14 wherein the security processor includes a security association cache configured to store security associations, and wherein the second processor is programmed, during use, to transmit an identifier of the first security association within the security association cache to the security processor instead of the first security association if the first security association is stored in the security association cache.

16. The apparatus as recited in claim 14 wherein the security processor is to transmit a first decrypted packet corresponding to the first encrypted packet to the second SOC, and wherein the second SOC includes a second one or more network circuits as the switch fabric, and wherein the second processor is programmed, during use, to transmit the first decrypted packet onto the second one or more network circuits.

17. The apparatus as recited in claim 16 wherein the second SOC is to receive a second unencrypted packet on the second one or more network circuits, and wherein the second processor is programmed, during use, to lookup a second security association in the security association database and to transmit the second unencrypted packet and the second security association to the security processor for encryption.

18. The apparatus as recited in claim 17 wherein the second SOC is to receive a second encrypted packet corresponding to the second unencrypted packet from the security processor, and wherein the second processor is programmed, during use, to transmit the second encrypted packet to the first SOC for transmission on one of the network interfaces.

19. The apparatus as recited in claim 12 wherein the one or more network interface circuits are to communicate as Ethernet interfaces.

20. The apparatus as recited in claim 12 wherein the security processor is to perform authentication processing on the incoming encrypted packets.

* * * * *